United States Patent
Rawstron et al.

[15] 3,661,355
[45] May 9, 1972

[54] INTERNAL BALL VALVE

[72] Inventors: William W. Rawstron, Northboro, Mass.; Edwin S. Carlson, Chicago, Ill.

[73] Assignee: Jamesbury Corporation, Worcester, Mass. by said Rawstron

[22] Filed: Feb. 2, 1967

[21] Appl. No.: 629,043

[52] U.S. Cl................................251/144, 251/315, 280/5
[51] Int. Cl.........................................F16k 5/06, B60p 3/22
[58] Field of Search..................251/144, 315, 172, 289, 310; 137/348, 267, 246.19, 347, 349; 280/5; 105/358

[56] References Cited

UNITED STATES PATENTS

| | | | |
|---|---|---|---|
| 1,204,176 | 11/1916 | Mitchell | 251/289 |
| 3,398,926 | 8/1968 | Scaramucci | 251/309 |
| 1,524,054 | 1/1925 | Penfield | 137/267 |
| 1,565,913 | 12/1925 | Dosker | 137/348 |
| 1,570,637 | 1/1926 | Nordstrom | 137/246.19 |
| 2,945,666 | 7/1960 | Freeman et al. | 251/172 |
| 2,989,990 | 6/1961 | Bass et al. | 251/315 |
| 3,100,499 | 8/1963 | Bass | 251/315 |
| 3,286,735 | 11/1966 | Yindrock | 251/144 |
| 3,367,623 | 2/1968 | Piel | 251/144 |

*Primary Examiner*—William R. Cline
*Attorney*—Robert F. Conrad

[57] ABSTRACT

The disclosure herein is directed to valving means of the type commonly used in highway and railway tank cars. The operating mechanism of the valve is positioned within the tank with only the actuator of the valve projecting beyond the tank surface. Accordingly, in the event of a wreck or the like, the valve will not be damaged. The valve, comprising a ball positioned in a body portion between a pair of resilient lip seals, is conveniently actuated from a side thereof or from the bottom by means of a valve stem which is in engagement with the ball of the valve.

6 Claims, 5 Drawing Figures

INVENTORS,
WILLIAM W. RAWSTRON
EDWIN S. CARLSON

INVENTORS,
WILLIAM W. RAWSTRON
EDWIN S. CARLSON

3,661,355

INTERNAL BALL VALVE

FIELD OF INVENTION

The present invention is directed to valves for use in fluid-tight containers. More particularly, this invention relates to valves of the ball valve type for draining a tank, drum, or the like, which are positioned within the vessel being drained. Such valves are particularly adapted for highway and railway tank cars which are used in transporting gaseous and liquid materials. Although the valves have other uses, the invention will be described as a matter of convenience with reference to a railway tank car.

BACKGROUND OF INVENTION AND PRIOR ART

In the past, tank cars for transporting fluids have usually employed valves actuated from the top of the tank car; see U.S. Pat. Nos. 1,455,796; 1,513,606; and 2,301,378. Additionally, relatively complicated means have been suggested such as tipping the entire tank of the tank car for removal of the material contained therein; see U.S. Pat. No. 1,595,152. The aforesaid valve construction and alternative procedures were considered essential in view of the danger of having any part of the valve project from the bottom of the tank where it was likely to be sheared off in the event of a collision, derailment, or the like, and result in the loss of the entire cargo. The problem is most critical when poisonous and/or flammable gasses under pressure are being transported. Although U.S. Pat. No. 1,565,913 suggested a protected valve in the bottom of a tank car, the proposed design was not successful apparently due to limitations in the valve mechanism and as a result of the exposure of a portion of the valve.

Accordingly, it is a primary object of the present invention to provide a ball valve for use in draining a tank, drum, or the like, which is enclosed within the vessel.

It is another object of the invention to provide a ball valve for use in draining a railway or highway tank car, which valve cannot be damaged in an accident.

It is still another object of the invention to provide an internal ball valve for use in tank which will permit complete drainage of the tank when positioned in its bottom.

It is another object of the invention to provide an improved combination of a tank and a ball valve positioned in a lower wall of the tank, wherein the valve is completely enclosed within the tank.

It is another object of the invention to provide the improved combination of a substantially cylindrical railway tank car and a ball valve positioned in the bottom of the tank, wherein the valve is completely enclosed within the tank.

These and other objects of the invention will become more fully apparent from the following detailed description with particular reference to the drawing.

The aforesaid and other objects are accomplished by designing a valve for use in a tank wherein the entire valve mechanism, with the exception of the actuating means, is mounted in the interior of the tank. The valve comprises a housing which projects into the interior of the tank and has a fluid passage communicating with the interior and the exterior of the tank through a ball having a flow port. A pair of resilient lip seals are employed which function in part to retain the ball in operative position within the housing and in part to provide a fluid-tight seal. The valve is mounted in the bottom of the tank by suitable means. The enclosed valve is actuated from outside the tank by turning a stem, one end of which is in engagement with the ball of the valve and with the other end extending through the valve housing. Since little, or no part of the valve projects below the bottom of the tank, in the event of an accident involving the tank, unless the tank is completely demolished, the valve will not be damaged. The valve, primarily as a result of the design of the resilient lip seals which are described in detail in Freeman et. al., U.S. Pat. No. 2,945,666, is exceptionally suited for use in a tank car designed for transporting liquids and gases.

The improved internal ball valve design will be more readily apparent from the following detailed description with reference to the drawing which illustrates the preferred construction of the valves. In the drawing, like numerals are employed to designate like parts throughout.

Figure 1:
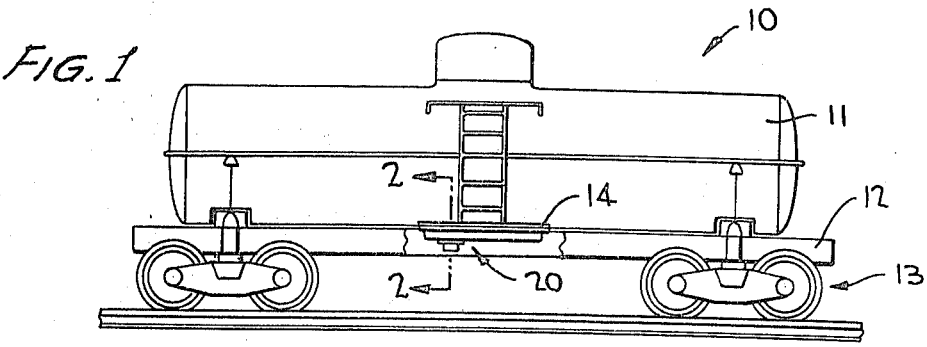
FIG. 1 is a side elevation of a railway vehicle illustrating the internal bottom outlet ball valve.

Referring more specifically to the drawing, the invention is illustrated on a railway vehicle such as a railway tank car 10 having a generally cylindrical tank shell 11 and a longitudinally extending center sill structure 12 mounted on trucks 13. A tank anchor 14 on either side of the car 10 secures shell 11 to the center sill structure 12 adjacent the bottom outlet structure indicated generally at 20.

Figure 2:
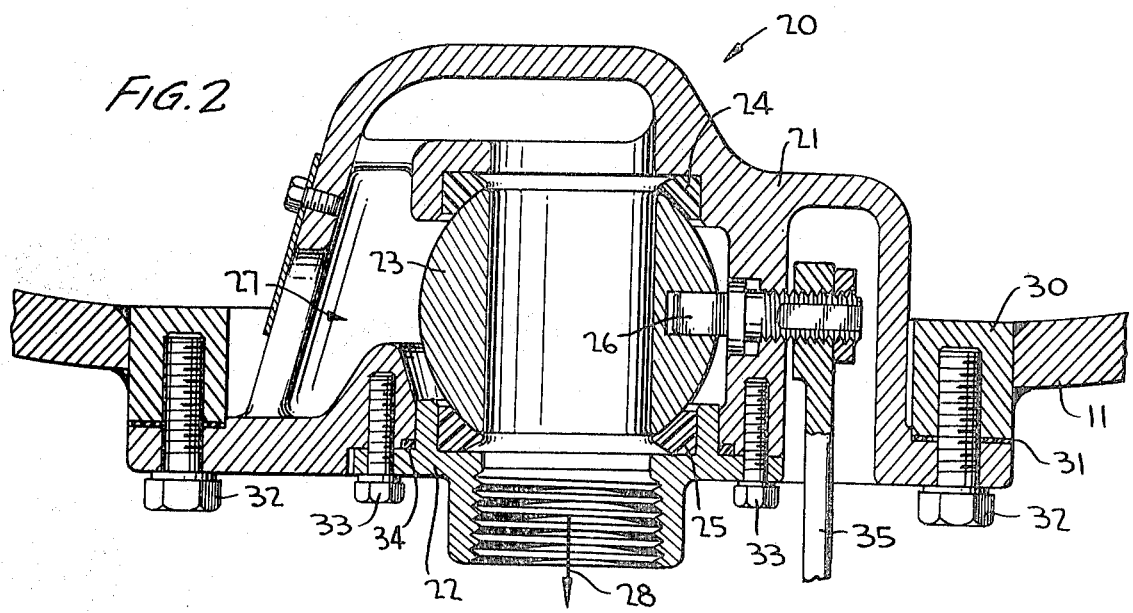
FIG. 2 is a sectional view taken generally along line 2—2 of FIG. 1 showing the ball valve structure in detail.
Figure 4:
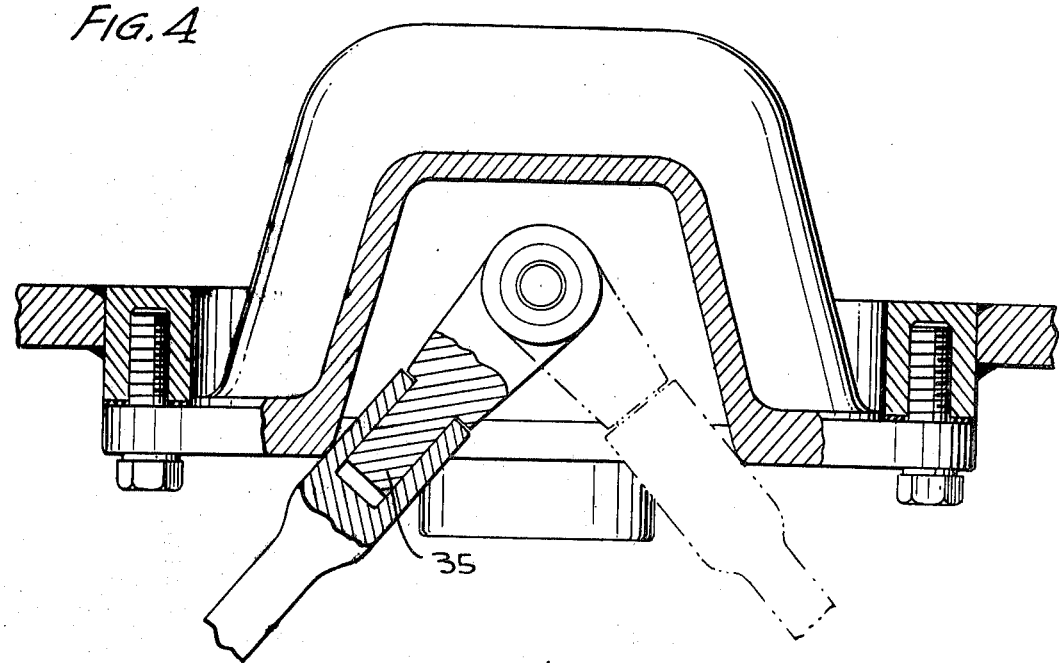
FIG. 4 is a view partly in section taken along line 4—4 of FIG. 2 showing the actuating mechanism.

Referring primarily to FIG. 2, which is a sectional view taken along line 2—2 of FIG. 1, valve 20 comprises a housing made up of two sections, casing 21 and bottom fitting 22. A metal ring 30 is welded to tank shell 11. Casing 21 is mounted to ring 30, separated by gasket 31, by a plurality of spaced bolts 32. Ball 23 which has a fluid flow port is retained in operative association between seals 24 and 25 by bottom fitting 22, which fitting is secured to casing 21 by a plurality of spaced bolts 33. Casing 21 and fitting 22 are maintained in fluid-tight relation by gasket 34. The ball is opened and closed by handle 35 which is in engagement with stem 26 secured in ball 23. Handle 35 which must be capable of moving the ball of the valve 90°, as shown more fully in FIG. 4, is in two pieces, with the outer-most piece being removable. The innermost piece is completely within the casted housing. Accordingly, there is little or no danger of the valve being accidentally turned on or turned on by vandals.

When the valve is open, fluid flow is through passage 27 through the port of the ball and out opening 28. Fitting 22 can be threaded, or the like, for attaching a pipe thereto to facilitate drainage of the tank. When the ball is turned 90°, the flow passage is blocked. Resilient lip seals 24 and 25, which are free to move upstream or downstream under pressure, maintain an effective fluid-tight seal.

As apparent from the drawing, the entire valve is inside, or flush with the outside, or bottom, of the tank. Therefore, in the event of an accident in which the tank shifts on the sills of the railway car, or similar happening, no damage to the valve can occur.

Figure 3:
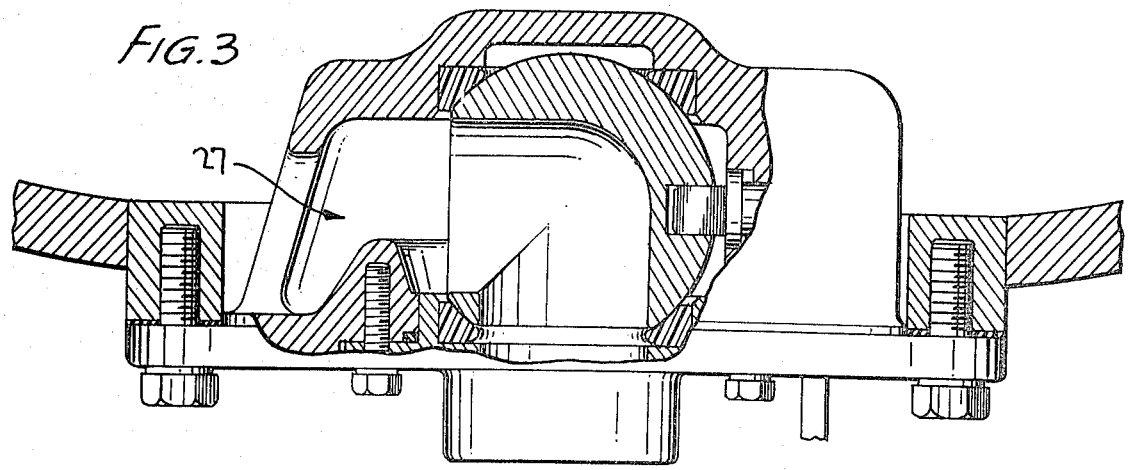
FIg. 3 is a view similar to that shown in FIG. 2 of a modified design.

FIG. 3 illustrates a modification to the design of the internal valve shown in FIG. 2. However, in the embodiment shown, the ball has an angle port. As shown in FIG. 3, the flow passage of the valve is below the lowest level of the shell of the tank, thus forming its own sump, permitting complete drainage of the tank.

Figure 5:
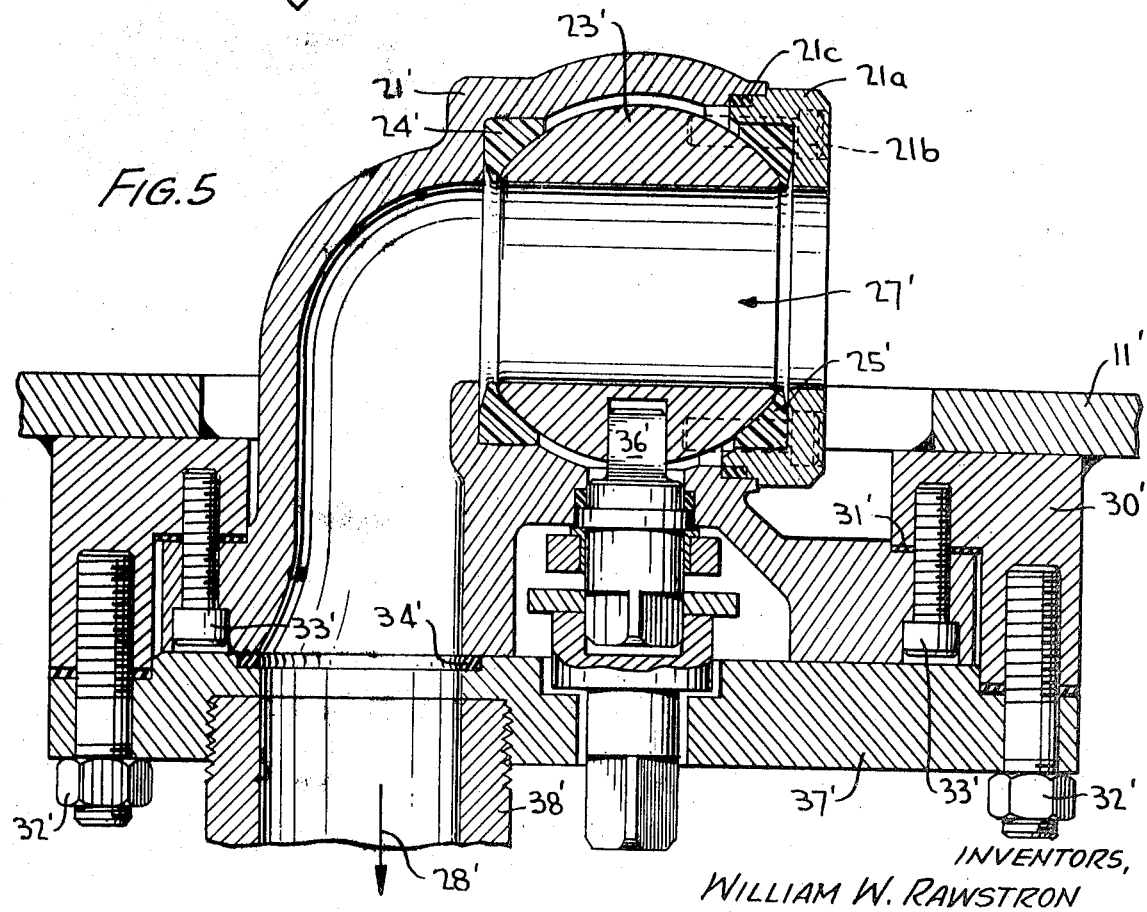
FIG. 5 again is a view similar to FIG. 2 showing another modified design.

FIG. 5 is a further modified design of the internal valve according to the present invention. The major difference is that the port in the ball of the valve is straight through as in FIG. 1. However, in this embodiment, casing 21 provides an angle passage. Accordingly, it is possible to have the valve turning mechanism at the bottom of the car permitting more convenient operation.

More specifically, the embodiment shown in FIG. 5 comprises an annular ring 30' welded to tank shell 11'. Housing 21' which forms an angle flow passage is mounted to angular ring 30' by means of a plurality of spaced bolts 33'. A fluid-tight seal is maintained by gasket 31'. Ball 23' which has a straight flow port is retained in operative association between seals 24' and 25' by fitting 21a which is held in place by bolts 21b. Fluid-tight engagement is maintained between 21' and 21a by means of gaskets 21c. The ball is opened and closed by turning stem 36'. A cover plate 37' which retains an extended fitting 38' is held in place by means of a plurality of spaced bolts 32'. A fluid-tight seal is maintained by 0 ring 34'. When the valve is in the open position, materials to be drained from the tank flow from the interior of the tank through passage 27', through the port of the ball, and out of angle passage 28'. Since the housing 21' provides an angle flow, complete drainage of the tank is possible since the valve forms its own sump.

As apparent from the drawing, the design shown in FIG. 5 has advantages over the design shown in FIG. 2 primarily from the standpoint of simplicity of construction. On the other hand, the design shown in FIG. 2 is less likely to be damaged in case of an accident, since virtually no part of the valve extends below the bottom of the tank.

Although the valve has been described with reference to a pair of resilient lip seals of the type described in Freeman et al., U.S. Pat. No. 2,945,666, it is possible to use other types of seals including the more conventional and less desirable compression seats. The inventive feature is primarily in the construction of the valve mechanism and the mounting of the valve in a tank. Furthermore, the invention is not to be limited by the illustrative embodiments. Numerous other modifications can be made by one skilled in the art using the present disclosure as a guide and, as such, are within the spirit and scope of the invention.

It is claimed:

1. A ball valve adapted to be mounted substantially within the confines of the interior volume of a vessel comprising
   a valve housing defining a ball chamber and flow passage means, said valve housing including annular mounting means adapted to be affixed to an opening in said vessel and thereby enclose said opening,
   defined within the annulus of said mounting means a flow opening and a separate, discrete actuator opening,
   a valve ball having a flow port therethrough rotatably mounted in said ball chamber,
   actuator means engaging said ball for rotation therewith and passing through said actuator opening in said annular mounting means in said ball of said valve housing, said actuator means adapted to rotate said ball chamber between an open position wherein said flow port through said ball provides fluid flow communication through said valve and said flow opening and a closed position wherein said communication is interrupted,
   wherein said annular mounting means include a sealing surface adapted to provide a seal with a portion of the surface of said vessel, and wherein said ball is rotated from said open to said closed position about an axis substantially parallel to said sealing surface and wherein at least a portion of said flow port of said ball, when said ball is rotated into the open position, is coaxially aligned with said flow opening in said annular mounting means.

2. The valve of claim 1 wherein said flow port in said ball has a straight line axis and said flow passage means in said valve housing defines a curving flow channel between an inlet port to said valve housing and said ball chamber.

3. The valve of claim 1 wherein said flow port in said ball has a non-linear axis, only the terminal portion of which is coaxially aligned with said flow opening in said annular mounting means.

4. In combination
   a storage vessel defining a storage cavity,
   a fluid outlet opening in said vessel, and
   a ball valve disposed within said storage cavity and affixed to said fluid outlet opening in said storage vessel comprising
   a valve housing assembly,
   an inlet flow passage in said valve housing assembly,
   an outlet flow passage in said valve housing assembly,
   a rotatably mounted ball with a flow port therethrough disposed within said valve housing assembly to permit fluid flow between said inlet flow passage and said outlet flow passage in said valve housing assembly when said ball is rotationally disposed in the open position and interrupting such flow when said ball is rotated from said open position about its axis of rotation, and
   a valve stem operatively connected at one end thereof to said ball to rotate said ball about its axis of rotation in unison with said stem, the other end of said valve stem engaged by actuator means extending out of said storage cavity through an actuator opening discrete from said outlet flow passage and thus through said fluid outlet opening of said vessel to permit actuation thereof from outside of said vessel and adjacent to said valve,
   wherein said fluid outlet opening is substantially in a single plane and said rotation of said ball is about an axis substantially parallel to said plane and wherein at least a portion of said flow port of said ball, when said ball is rotated into the open position, is coaxially aligned with said fluid outlet opening.

5. The combination of claim 4 wherein said flow port in said ball has a straight line axis and said inlet flow passage valve housing assembly defines a curving flow channel to said flow port when said ball is rotated into the open position.

6. The combination of claim 4 wherein said flow port in said ball has a non-linear axis, only the terminal portion of which is coaxially aligned with said fluid outlet opening.

* * * * *

UNITED STATES PATENT OFFICE
CERTIFICATE OF CORRECTION

Patent No. 3,661,355      Dated May 9, 1972

Inventor(s) WILLIAM W. RAWSTRON et al

It is certified that error appears in the above-identified patent and that said Letters Patent are hereby corrected as shown below:

In Claim 1, the phrase "in said ball" should be deleted in line 41 and the phrase -- in said ball -- should be inserted after "said ball" in line 42.

Signed and sealed this 29th day of May 1973.

(SEAL)
Attest:

EDWARD M. FLETCHER, JR.
Attesting Officer

ROBERT GOTTSCHALK
Commissioner of Patents